United States Patent
Bowra et al.

(10) Patent No.: US 8,578,045 B2
(45) Date of Patent: Nov. 5, 2013

(54) ADAPTIVE BANDWIDTH UTILIZATION

(75) Inventors: Todd Bowra, Redmond, WA (US);
Nicholas Fang, Redmond, WA (US);
Ashley Speicher, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1267 days.

(21) Appl. No.: 11/706,126

(22) Filed: Feb. 14, 2007

(65) Prior Publication Data

US 2008/0195745 A1    Aug. 14, 2008

(51) Int. Cl.
*G06F 15/16* (2006.01)

(52) U.S. Cl.
USPC .......................................... 709/232; 709/231

(58) Field of Classification Search
USPC ................................................ 709/231, 232
See application file for complete search history.

(56) References Cited

U.S. PATENT DOCUMENTS

| | | | |
|---|---|---|---|
| 5,193,151 A * | 3/1993 | Jain | 709/237 |
| 5,963,202 A | 10/1999 | Polish | |
| 6,944,221 B1 | 9/2005 | Keesman | |
| 7,130,937 B2 | 10/2006 | Hwang et al. | |
| 2002/0036704 A1 | 3/2002 | Kim et al. | |
| 2003/0092421 A1 | 5/2003 | Dolwin | |
| 2003/0236907 A1 * | 12/2003 | Stewart et al. | 709/231 |
| 2004/0057420 A1 | 3/2004 | Curcio et al. | |
| 2004/0125816 A1 | 7/2004 | Xu et al. | |
| 2005/0047333 A1 | 3/2005 | Todd et al. | |
| 2005/0117580 A1 | 6/2005 | del Val et al. | |
| 2005/0198364 A1 * | 9/2005 | Val et al. | 709/236 |
| 2006/0168288 A1 | 7/2006 | Covell et al. | |

FOREIGN PATENT DOCUMENTS

WO    WO0122682 A2    3/2001
WO    WO2005050945 A1    6/2005

OTHER PUBLICATIONS

Adaptive Buffer Sensitive Scheduling for Transmitting Video Streams in a Mobile Multimedia System, Authors: Joe Yuen, Kam-Yiu Lam, Edward Chan, rtas, pp. 0125, Seventh IEEE Real-Time Technology and Applications Symposium (RTAS'01), 2001 http://www.computer.org/portal/web/csdl/doi/10.1109/RTTAS.2001.929876.*
Krasic, et al.,"Quality-Adaptive Media Streaming by Priority Drop", Date: 2003, pp. 112-121, ACM Press, NY, USA, http://delivery.acm.org/10.1145/780000/776341/p112-krasic.pdf?key1=776341&key2=3195943611&coll=GUIDE&dl=GUIDE&CFID=6087238&CFTOKEN=55962236.
Merwe, et al., "Streaming Video Traffic: Characterization and Network Impact", http://public.research.att.com/~kobus/docs/wcw2002.slogan.2.pdf.
Rejaie, et al., "RAP: An End-to-end Rate-based Congestion Control Mechanism for Realtime Streams in the Internet", Date: 1999, http://ieeexplore.ieee.org/iel4/6063/16232/00752152.pdf?isNumber=.

* cited by examiner

*Primary Examiner* — Noel Beharry (57) ABSTRACT

Described herein is technology for, among other things, improving playback of media streams by maximizing bandwidth utilization. The technology may be implemented via a remote playback device on a network. It involves monitoring requests for portions of streaming media content and the associated responses to the requests and then adjusting request parameters to more effectively utilize available bandwidth. The effective available bandwidth may be controlled by moderating requests in order to induce behavior favorable to media streaming in the flow control mechanisms which control the amount of data sent in response to a request.

20 Claims, 7 Drawing Sheets

ADAPTIVE BANDWIDTH UTILIZATION

BACKGROUND

Computer networks couple various types of computer systems in a manner that enables the network coupled computer systems to access data from a variety of sources of information. Some computer networks allow media content to be streamed from one or more network coupled sources of media content to one or more network coupled receivers of media content. In such computer networks, media content can be streamed by media content servers and played back by media content playback systems that are associated with the media content receivers. Conventional systems often use Hypertext Transfer Protocol (HTTP) and Transmission Control Protocol (TCP) to stream media across a network to media receivers.

As more and more devices are connected to networks, the ability to effectively use bandwidth becomes increasingly important for smooth playback. Some modern communication protocols, such as TCP, divide data into packets and guarantee that packets reach their destination in sequence. The receiving device sends acknowledgements of packets received and requests retransmission when packets are not received from the sending device. In order to reduce packet loss, communication protocols have flow control mechanisms that adjust, based on network congestion, how much data can be sent to a device each time data is sent. For example, TCP supports flow control though the concept of a window, which is the amount of outstanding (unacknowledged by the recipient) data a sender can send on a particular connection before it waits to receive an acknowledgment back from the receiver that it has received some of the data. After TCP has sent the amount of data corresponding to the window size, no more data is sent until the client transmits to the server an acknowledgment of received data, which is in the form of updated window information indicating that the client is ready to receive more data. As more and more packets are successfully received and acknowledged, TCP slowly increases the window size and thereby increases the amount of data sent in each transmission and thus increasing the bandwidth utilization.

When the amount of data transmitted exceeds the available network bandwidth, there is packet loss and requests for retransmission are sent to the sending device. Communications with flow control based on congestion respond to this by reducing the amount of data sent during each transmission. For example, any packet loss is assumed to be a result of network congestion by TCP and it responds by backing off, cutting the window size in half instead of continuing to send packets that will be lost. This sudden reduction in the TCP window is known as window collapse.

TCP responds this way whether the packet loss was caused by temporary fluctuations in bandwidth or by exceeding the available bandwidth. For example, as soon as a device tries to send more data than the network can reliably transmit there will be packet loss. The receiving device will then send requests for retransmission and TCP responds by backing off, significantly reducing the rate at which data is sent from the host If the rate at which data is sent is lower than the total network capacity, the remaining network bandwidth will remain unused until TCP slowly increases the window size again. Thus, TCP may dramatically and unnecessarily reduce how much effective throughput is available.

Sudden reductions in available bandwidth can negatively impact playback of streaming media. Playback devices typically have jitter or data buffers to allow playback to continue smoothly despite network issues such as connection interruptions or bandwidth changes. Before starting playback, a playback device will download sufficient data to fill the buffer so that playback can proceed smoothly. As the content in the buffer is played, the playback device makes subsequent requests to buffer the next portion of the content. A reduction in available bandwidth impacts the ability of a device to fill the buffer and thus the ability to provide smooth playback. For example, in the case of video streaming over a network to a device if the network throughput is suddenly cut in half by TCP, it may not be possible to refill the buffer fast enough to avoid being forced to halt playback.

Playback can further be impacted because flow control mechanisms may reduce the amount of data sent during transmissions following periods of non-communication from the receiver. In particular, this situation may occur if the last window raise request from the receiver is lost and the receiver does not send a new request for data. If the receiver is under heavy load and cannot process data as fast as the sender is sending it, the window size will decrease until it eventually gets to 0. When this happens, the sender is prevented from sending data until it receives a window update from the receiver with a non-zero window size. If that window update is lost, then the host could wait indefinitely. To prevent such an infinite wait, TCP implements a "persist timer" which, every 5-60 seconds, will fire off a zero window probe from the sender to the receiver. This 1-byte probe effectively queries the client for the actual size of the window, as the receiver will send its window size as part of the acknowledge for the probe. While this behavior works well for non-real-time networking scenarios, it works very poorly for real-time streaming. During the "persist timer" waiting period, the receiving device's buffer may deplete sufficiently such that the device is forced to halt playback. For example, if there is a five second buffer and no data is transmitted for five seconds due a lost window raise request, the device will run out of data to play and will starve, causing glitching and drop-outs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, improving playback of media streams by maximizing bandwidth utilization. The technology may be implemented via a remote playback device on a home network. It involves monitoring requests for portions of streaming media content and the associated responses to the requests and then adjusting request parameters to more effectively utilize available bandwidth. The effective available bandwidth may be controlled by altering data requests in order to best take advantage of flow control mechanisms which control the amount of data sent in response to a request.

In one implementation, request parameters are adjusted to maintain or increase the Transmission Control Protocol (TCP) window during Hypertext Transfer Protocol (HTTP) media streaming. The frequency and size of requests are adjusted to maintain or increase the TCP window. Reductions in the TCP window are avoided by making small requests or requests such as HTTP HEAD requests during periods of sporadic requests. Based on monitored bandwidth, requests are modified or moderated so as to make maximum use of available bandwidth.

Thus, techniques described herein provide for smooth playback of streaming media by making efficient use of bandwidth especially when encountering bandwidth limited situations.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, improving playback of media streams by maximizing bandwidth utilization. The technology may be implemented via a remote playback device on a home network. It involves monitoring requests for portions of streaming media content and the associated responses to the requests and then adjusting request parameters to more effectively utilize available bandwidth. The effective available bandwidth may be controlled by altering data requests in order to best take advantage of flow control mechanisms which control the amount of data sent in response to a request.

In one embodiment, request parameters are adjusted to maintain or increase the Transmission Control Protocol (TCP) window during Hypertext Transfer Protocol (HTTP) media streaming. The frequency and size of requests are adjusted to maintain or increase the TCP window. Reductions in the TCP window are avoided by making small requests or requests such as HTTP HEAD requests during periods of sporadic requests. Based on monitored bandwidth, requests are modified or moderated so as to make maximum use of available bandwidth.

Figure 1:
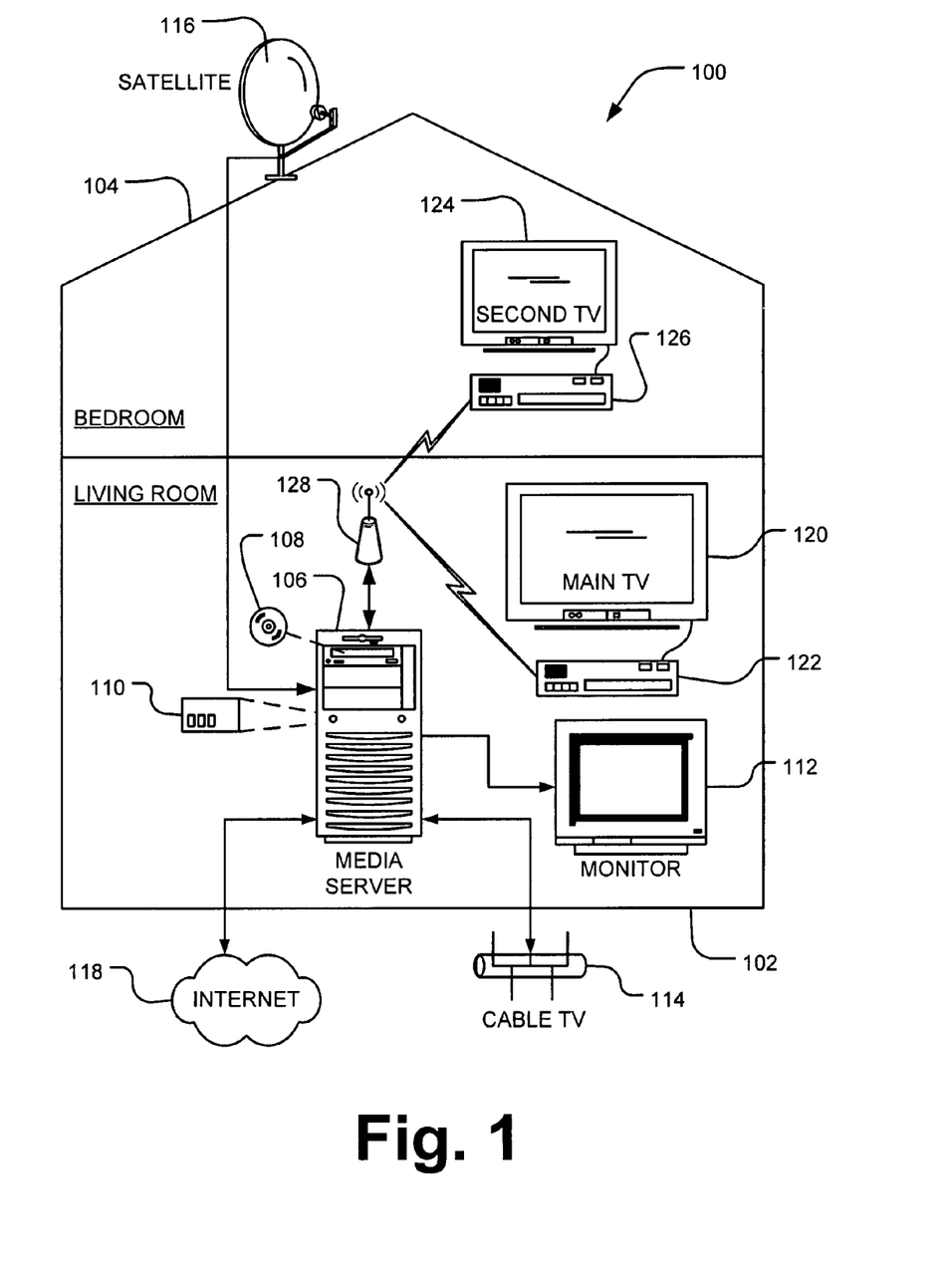
FIG. 1 shows a home entertainment operating environment according one embodiment.

FIG. 1 shows an exemplary home operating environment according to one embodiment. In a home entertainment operating environment 100 such as is shown in FIG. 1, media receivers 122 and 126 can be placed in communication with media server 106 through network 128 (for example a local area network (LAN)). In an exemplary embodiment, the media receivers 122, 126 can be Media Center Extender devices, for example, an Xbox 360™ (Microsoft Corporation, Redmond, Wash.).

In addition to the aforementioned Media Center Extender devices, media receivers 122 and 126 can also include a variety of conventional media rendering or computing devices, including, for example, a set-top box, a television, a video gaming console, a desktop PC, a notebook or portable computer, a workstation, a mainframe computer, an Internet appliance, a handheld PC, a Digital Audio Player (DAP), a Digital Video Player (DVP), a Digital Video Recorder (DVR), a cellular telephone or other wireless communications device, a personal digital assistant (PDA), or combinations thereof. Furthermore, media receivers 122 and 126 can include a tuner as described above.

Network 128 can comprise a wired and/or a wireless network. In one embodiment, network 128 can include but is not limited to, for example, cable 114, Ethernet, WiFi, a wireless access point (WAP), or any other electronic coupling means, including the Internet 118. It should be appreciated that network 128 can accommodate communication between media server 106, media receivers 122 and 126 and any other coupled device through packet-based communication protocols, such as Transmission Control Protocol (TCP), Internet Protocol (IP), Real-time Transport Protocol (RTP), Real-time Transport Control Protocol (RTCP), and Hypertext Transfer Protocol (HTTP). In one embodiment, communications can be transmitted directly between devices over a LAN, or they may be carried over a wide area network (WAN), for example, the Internet 118.

In one embodiment, as is shown in FIG. 1, one or more video display devices, for example a main TV 120 in a first room (e.g., living room 102), a secondary TV 124 in a second room (e.g., bedroom 104), and a video monitor 112 can be situated at disparate locations in home operating environment 100. These video display devices can be coupled to media server 106 via network 128 either directly or via media receivers 122 and 126.

In one embodiment, main TV 120 and secondary TV 124 can be coupled to media receivers 122 and 126 through conventional cables. In another embodiment, main TV 120 and secondary TV 124 can be coupled to media receivers 122 and 126 via wireless transmissions.

Video monitor 112 can be coupled to media server 106 directly via a video cable or via wireless transmissions. Media server 106 and media receivers 122 and 126 can also or alternatively be coupled to any of a variety of other video and audio presentation devices. Importantly, media content, including TV content, can be supplied to each of the video display devices 112, 120 and 124 over home network 128 from a media server (e.g., 106) that can be situated in a remote room (e.g. living room 102).

Media receivers 122, 126 can be configured to receive streamed media content, including video and TV content, from media server 106. Media content, particularly video and TV content, can be transmitted from the media server 106 to media receivers 122 and 126 as streaming media comprised of discrete content packets via any of the network protocols described above. The streamed media content can comprise Internet-sourced video delivered via IP, standard definition, and high definition content, including video, audio, and image files, decoded on media receivers 122 and 126 for presentation on the coupled TVs 120 and 124.

The media content can further be "mixed" with additional content, for example, an Electronic Program Guide (EPG), presentation content related to the media content, a web browser window, and other user interface environments transmitted from the media server for presentation on TVs 120 and 124 or monitor 112. Such additional media content can be delivered in a variety of ways using different protocols, including, for example, standard remote desktop protocol (RDP), graphics device interface (GDI), or hypertext markup language (HTML).

In addition to the media receivers 122 and 126 and video display devices 112, 120 and 124, media server 106 can be coupled to other peripheral devices, including components such as digital video recorders (DVR), cable or satellite set-top boxes, speakers, and a printer (not shown for the sake of graphic clarity). Media server 106 and media receivers 122 and 126 can also enable multi-channel output for speakers. This can be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) audio.

Figure 2:
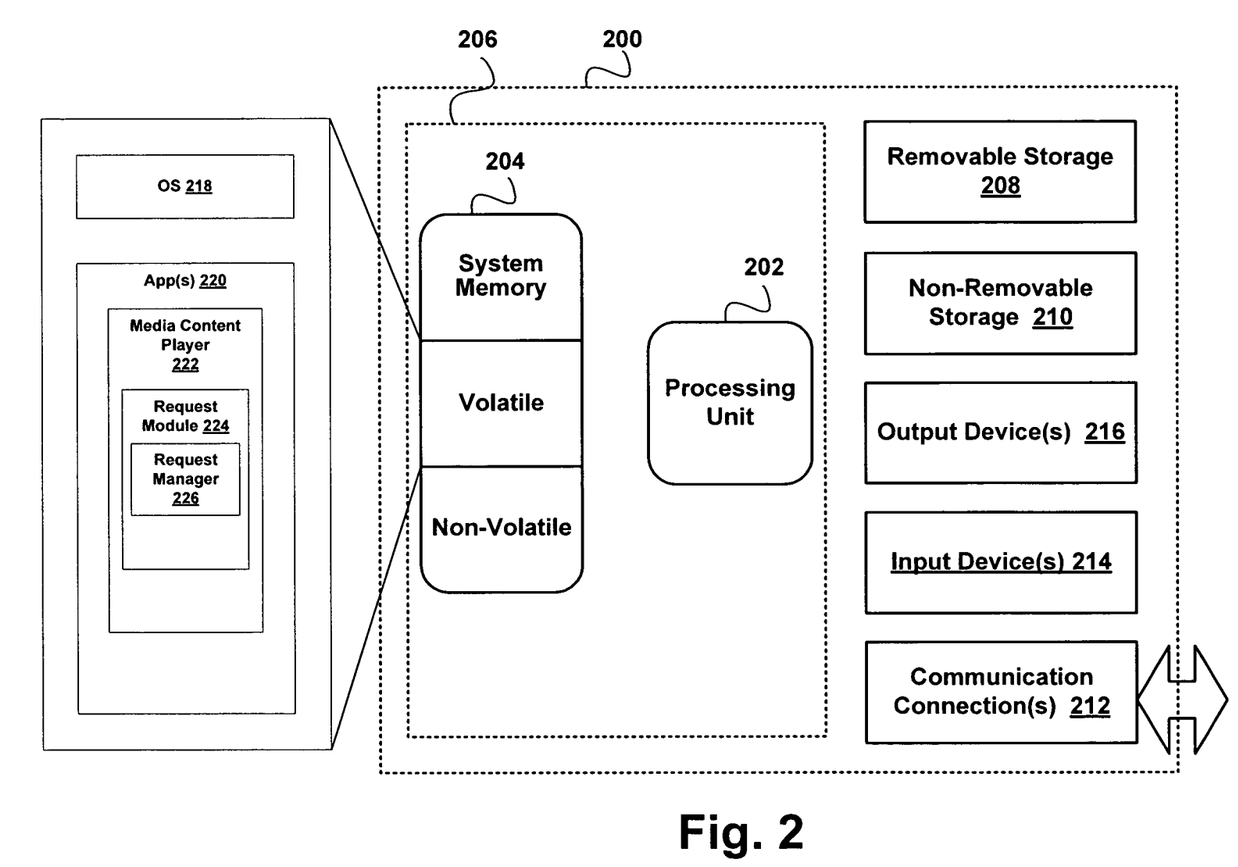
FIG. 2 shows an exemplary hardware operating environment according to one embodiment.

With reference to FIG. 2, an exemplary system for implementing embodiments includes a general purpose playback system environment, such as playback system environment 200. In its most basic configuration, playback system environment 200 typically includes at least one processing unit 202 and memory 204. Depending on the exact configuration and type of playback system environment, memory 204 may be volatile (such as RAM), non-volatile (such as ROM, flash memory, etc.) or some combination of the two. This most basic configuration is illustrated in FIG. 2 by dashed line 206. System memory 204 among other things, includes Operating System 218 (OS) and Applications 220. In one embodiment, Applications 220 will include a Media Content Player 222 for playing various types of media. These various types of media may include, but are not limited to, digital audio, home videos, downloaded videos, radio broadcasts, television broadcasts, cable broadcasts, recorded television, digital versatile discs (DVDs), programming guides, and photographs.

Among other things, Media Content Player 222 includes request module 224 which is responsible for facilitating requests for media content for playback. This can include making requests for the next portions of media content for streaming media playback. Request Module 224 further includes request manager 226, a system for maximizing or maintaining bandwidth utilization by adjusting request parameters. Request manager 226 monitors requests and request responses and then adjusts request parameters accordingly to maximize or maintain bandwidth utilization. In one embodiment, request manager 226 may adjust parameters to maintain or maximize the TCP window associated with communications between playback system 200 and a media server (e.g. media server 106).

Additionally, playback system environment 200 may also have additional features/functionality. For example, playback system environment 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules, or other data. Memory 204, removable storage 208, and nonremovable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by playback system environment 200. Any such computer storage media may be part of playback system environment 200.

Playback system environment 200 may also contain communications connection(s) 212 that allow it to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media.

Communications connection(s) 212 may also allow playback system environment 200 to communication with devices including, but not limited to, TV tuners, DVD players and recorders, digital cameras, web cameras, digital video recorders, radio tuners, and programming guides.

Playback system environment 200 may also have input device(s) 214 such as a keyboard, mouse, pen, voice input device, touch input device, remote control, etc. Output device(s) 216 such as a display, speakers, etc. may also be included. All these devices are well known in the art and need not be discussed at length here.

The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

Figure 3:
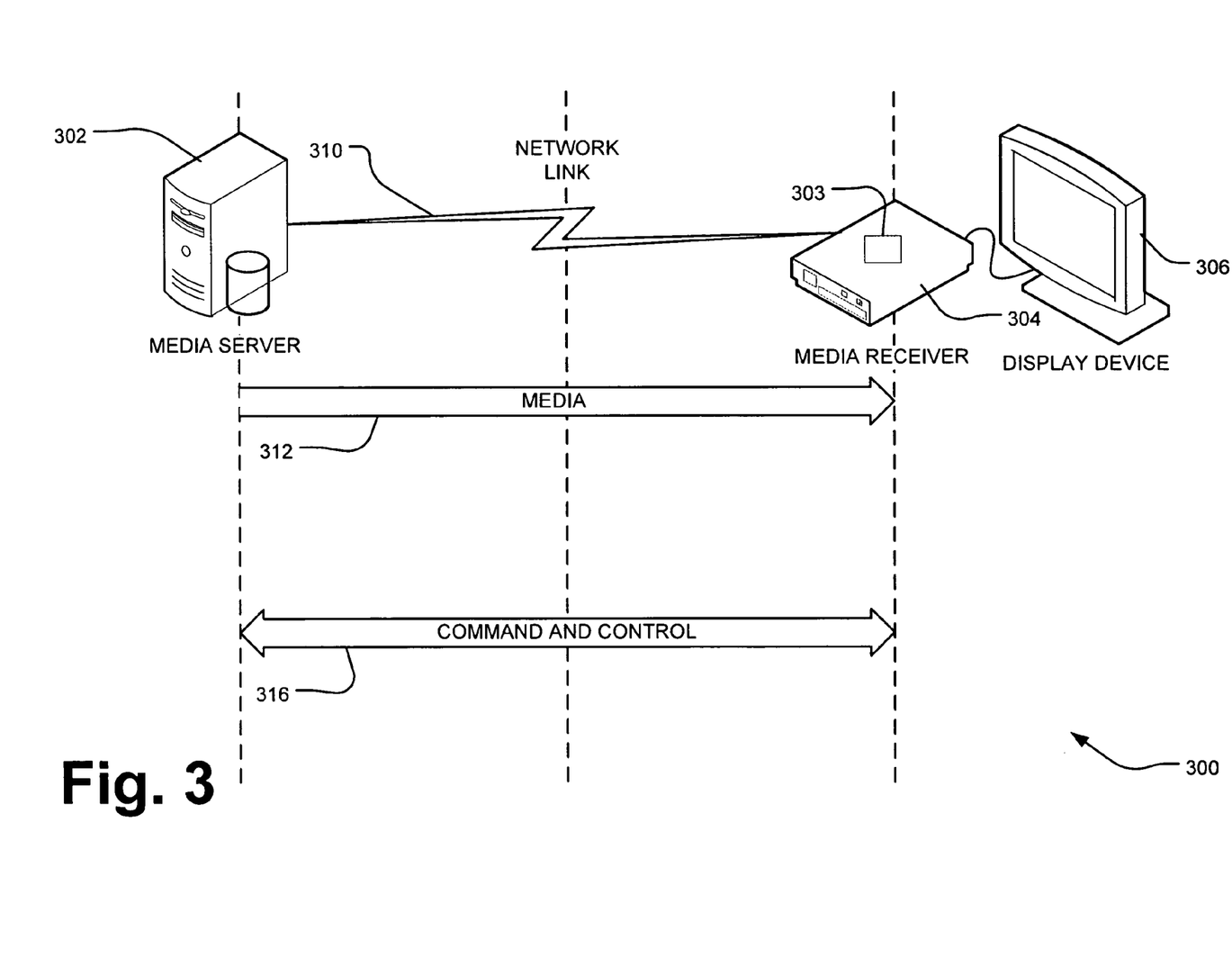
FIG. 3 shows an exemplary network operating environment of a system for improved playback by maximizing bandwidth utilization in accordance with an embodiment.

FIG. 3 shows an exemplary network operating environment 300 of a system 303 for maximizing use of available bandwidth to facilitate smooth playback, in accordance with an embodiment. Exemplary network operating environment 300 may be implemented on the operating environments described above. Exemplary network operating environment 300 includes: media server 302, network link 310, media receiver 304, display device 306, and system 303 for maximizing bandwidth utilization.

Media server 302 is an exemplary server as described above as media server 106 capable of providing and receiving media in a home network environment as discussed above in relation to FIG. 1. Network link 310 allows media server 302 to provide media 312 to media receiver 304. Network link 310 further facilitates command and control communications 316 between media server 302 and media receiver 304. Network link 310 may use Hypertext Transfer Protocol (HTTP) or Real-time Transport Protocol (RTP) to transfer content from media server 302 to media receiver 304. In one embodiment, media receiver 304 contains system 303 for maximizing bandwidth utilization.

System 303 facilitates smooth playback by adjusting request parameters to maximize or maintain use of available bandwidth. In one embodiment, requests and the responses to those requests are monitored and then modified to make maximum use of available bandwidth. The requests and the request responses can be monitored for various characteristics including: delays or latency, changes in throughput, time between the completion of requests and subsequent requests, and the throughput history. Based on the characteristics, modifications are made to request parameters including: size, type, and frequency. The request modifications may be made to maintain or maximize the Transport Control Protocol (TCP) window.

Display device 306 is coupled to media receiver 304 which allows a user to view media 312. In one embodiment, display device 306 may be a computer monitor or television such as televisions 120 and 124 as discussed above in relation to FIG. 1. Media receiver 304 may receive input from a user through a remote control.

Media receiver 304 may handle the user commands directly or partially and pass all or part of the commands to media server 302 via network link 310. Thus, the user may browse and view content on media server 302 on display device 306 via media receiver 304 and network link 310.

Figure 4A:
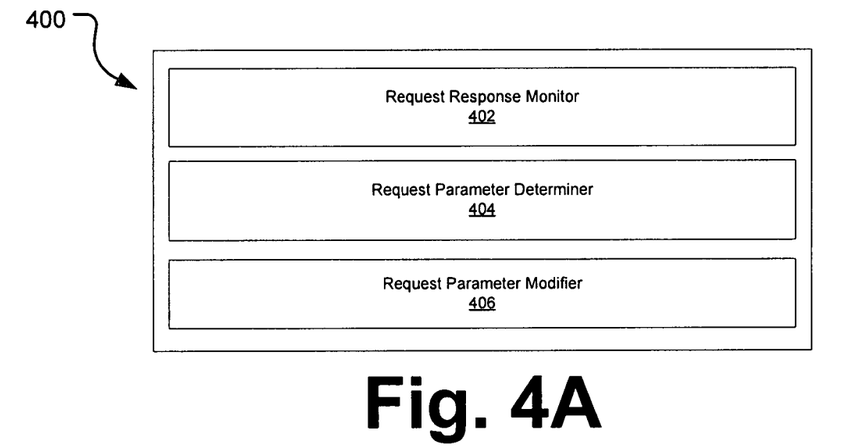
FIG. 4A shows components of a system for maximizing bandwidth utilization, in accordance with an embodiment.

FIG. 4A shows components of a system 400 for maximizing use of available bandwidth in accordance with one embodiment. System 400 facilitates more reliable playback of content being streamed by maximizing use of available bandwidth. The media content may be streaming from a media server (e.g. 302 in FIG. 3) to a media receiver (e.g. 304 in FIG. 3). In one embodiment, the media content is streamed over a network connection using Hypertext Transfer Protocol (HTTP), which operates over Transport Control Protocol (TCP). The requests can include HTTP GET requests for portions of the media content. It is further appreciated that while embodiments are described herein with exemplary protocol Transmission Control Protocol (TCP), embodiments can use other protocols with flow control. System 400 includes: request response monitor 402, request parameter determiner 404, and request parameter modifier 406.

It should be appreciated that the aforementioned components of system 400 can be implemented in hardware or software or in a combination of both. In one embodiment, components and operations of system 400 can be encompassed by components and operations of one or more computer programs that execute on a media receiver (e.g., 304 in FIG. 3). In another embodiment, components and operations of system 400 can be separate from the aforementioned one or more computer programs but can operate cooperatively with components and operations thereof.

Referring to FIG. 4A, request response monitor 402 monitors throughput characteristics of the response to a request. This can include monitoring the delay or latency in receiving the initial data in response to a request and the data transfer rate throughout the response. An initial delay or latency in receiving a response can indicate that that the network has some level of congestion. A change in the transfer rate over the course of a response can indicate that flow control mechanisms are increasing the amount of data sent each time a transmission is made. For example, the initial transfer rate of a request response may be limited by the TCP window and as subsequent portions of the response are received the TCP window may have increased resulting in an increased transfer rate.

Request parameter determiner 404 determines changes to the request parameters necessary to facilitate improved playback by maximizing use of available bandwidth. The request parameters are determined based on the throughput characteristics or properties of the responses to the requests monitored by request response monitor 402. It is appreciated that request parameter determiner 404 may use the throughput characteristics or properties monitored by request response monitor 402 individually or in combination in order to determine appropriate changes to request parameters. The request parameters may be determined in order to stabilize and maximize the TCP window.

In one embodiment, if there is a delay or latency in receiving the initial data of a request or the initial transfer rate is lower than the transfer rate later in a response, request parameters are determined to make requests smaller and more frequent.

Adjusting the request parameters in this way may induce the flow control mechanisms to adjust to maintain the amount of data sent in each transmission. For example, an increase in frequency of requests can maintain the TCP window and thus stabilize the use of available bandwidth.

Conversely, where there is no latency or change in transfer rate over the course of a response, request parameters can be determined to make larger, more infrequent requests. These can be determined to cause flow control mechanisms to increase or maintain the amount of data sent with each transmission, which may result in lower processing overheard on the server and/or receiver.

Request parameter modifier 406 implements the request parameters determined by request parameter determiner 404. It is appreciated that request parameter modifier 406 may implement some or all of the parameters determined by request parameter determiner 404. In one embodiment, request parameter modifier 406 implements changes to the request parameters of a media receiver (e.g. 304 in FIG. 3) receiving streaming media content to prevent TCP from backing off.

Figure 4B:
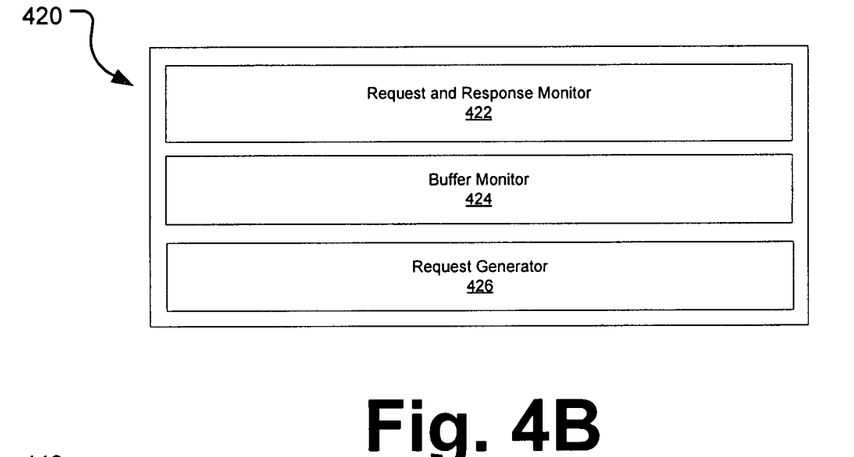
FIG. 4B shows components of a system for maintaining available bandwidth, in accordance with an embodiment.

FIG. 4B shows components of a system 420 for maintaining available bandwidth in accordance with one embodiment. System 420 facilitates more reliable playback of content being streamed by maintaining bandwidth utilization. The media content may be streaming from a media server (e.g. 302 in FIG. 3) to a media receiver (e.g. 304 in FIG. 3). In one embodiment, the media content is streamed over a network connection using Hypertext Transfer Protocol (HTTP) over Transport Control Protocol (TCP). The requests can include HTTP GET requests for portions of the media content. It is further appreciated that while embodiments are described herein with exemplary protocol Transmission Control Protocol (TCP), embodiments can use other protocols with flow control. System 420 includes: request and response monitor 422, buffer monitor 424, and request generator 426.

It should be appreciated that the aforementioned components of system 420 can be implemented in hardware or software or in a combination of both. In one embodiment, components and operations of system 420 can be encompassed by components and operations of one or more computer programs that execute on a media receiver (e.g., 304 in FIG. 3). In another embodiment, components and operations of system 420 can be separate from the aforementioned one or more computer programs but can operate cooperatively with components and operations thereof.

Referring to FIG. 4B, request and response monitor 422 monitors how frequently requests are being made. The time between the completion of a response and the initiation of the next request is tracked. This monitoring of the time between requests allows a determination of the appropriate amount of data that should be requested at one time based on the previous requests.

Buffer monitor 424 monitors the amount of playback time in the buffer. Buffer monitor 424 detects the situation where the data downloaded to a buffer will result in no requests for periods longer than previous periods between requests. During the period of inactivity or no requests, flow control mechanisms may reduce the amount of data sent in response to a request and thus limit the effective bandwidth. For example, where a request is made for variable bit rate media, the buffer may hold data for playback for periods much longer than the normal buffer playback time and thus requests are unnecessary for an extended period of time during which time the TCP window may decrease to 0.

Request generator 426 generates requests to maintain the availability of network bandwidth. Requests are made to ensure that TCP does not back off, which in turn assures that the effective available network bandwidth remains constant during each transmission. The requests may be additional requests for small portions of the content. For example, the requests may be small HTTP GET requests for the next portions of the content. The requests may also be requests whose purpose is to implicitly transmit window information to the server but return no content. For example, the requests may be HTTP HEAD requests which are similar to HTTP GET requests except they do not return the content body of a request. Thus, the requests may be made to maintain the TCP window such that the bandwidth available to the next request will be the same as the last request. Request generator 426 may initiate the above described requests on a different communication socket so as to not impact the communication socket currently being used for media content requests.

Figure 4C:
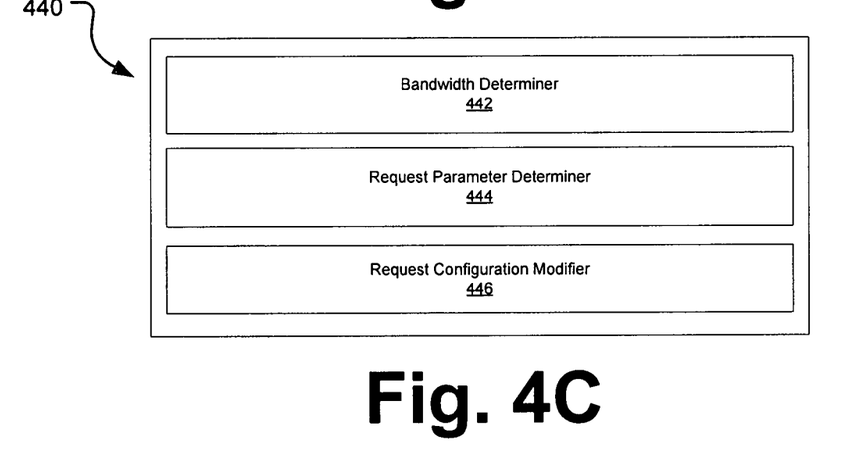
FIG. 4C shows components of a system for maximizing bandwidth utilization, in accordance with an embodiment.

FIG. 4C shows components of a system 440 for maximizing utilization of available bandwidth in accordance with one embodiment. System 440 facilitates more reliable playback of content being streamed to a media receiver via maximized use of available bandwidth. The media content may be streaming from a media server (e.g. 302 in FIG. 3) to a media receiver (e.g. 304 in FIG. 3). In one embodiment, the media content is streamed over a network connection using Hypertext Transfer Protocol (HTTP) and Transport Control Protocol (TCP). The requests can include HTTP GET requests for portions of the media content. It is further appreciated that while embodiments are described herein with exemplary protocol Transmission Control Protocol (TCP), embodiments can use other protocols with flow control. System 440 includes: bandwidth determiner 442, request parameter determiner 444, and request parameter modifier 446.

It should be appreciated that the aforementioned components of system 440 can be implemented in hardware or software or in a combination of both. In one embodiment, components and operations of system 440 can be encompassed by components and operations of one or more computer programs that execute on a media receiver (e.g., 304 in FIG. 3). In another embodiment, components and operations of system 440 can be separate from the aforementioned one or more computer programs but can operate cooperatively with components and operations thereof.

Referring to FIG. 4C, bandwidth determiner 442 monitors the throughput of responses to requests during media content playback. Bandwidth determiner 442 monitors the time it takes to receive each of the requests and determines an approximate network bandwidth based on the throughput of all previous responses.

Request parameter determiner 444 uses the approximate network bandwidth to determine request parameters to maximize bandwidth utilization. For example, in cases where network bandwidth is relatively limited, request parameters are determined that adjust the size and frequency of requests such that servicing those requests does not result in network overload, thus preventing TCP backoff, which in turn ensures maximum bandwidth utilization.

Request configuration modifier 446 implements the request parameters determined by request parameter determiner 444. It is appreciated that request configuration modifier 446 may implement some or all of the parameters determined by request parameter determiner 444. In one embodiment, request configuration modifier 446 implements changes to the request parameters of a media receiver (e.g. 304 in FIG. 3) receiving streaming media content to increase or maintain the TCP window.

Figure 5:
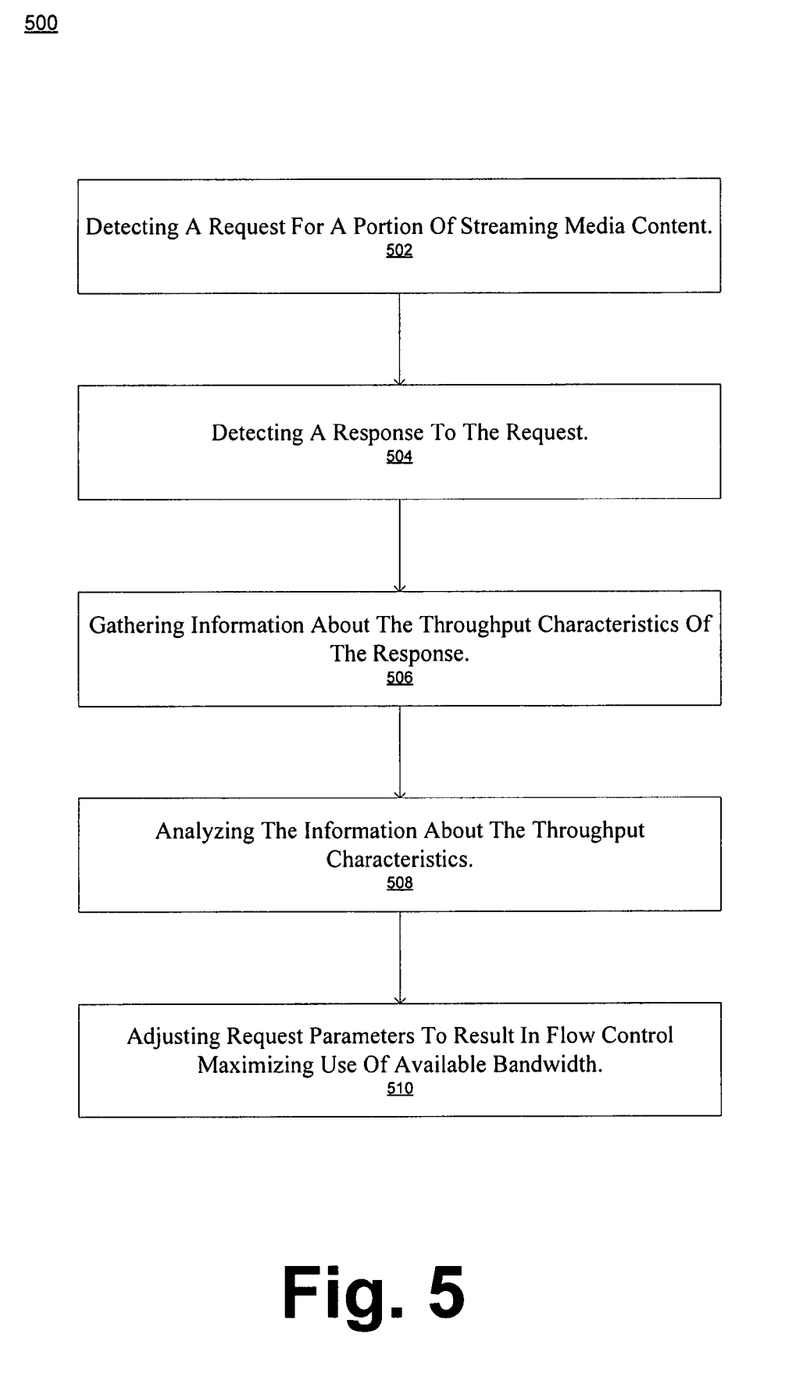
FIG. 5 is a flowchart of a process for modifying requests to maximize bandwidth utilization, in accordance with an embodiment.

FIG. 5 is a flowchart of an exemplary process 500 for modifying requests to maximize bandwidth utilization, in accordance with an embodiment. Process 500 may be implemented on the operating environments described above. Process 500 is well-suited to be stored as instructions on a computer-readable medium. In an exemplary embodiment, process 500 operates on a media receiver. It is appreciated that not all steps of process 500 are necessary for the general goal of process 500 to be achieved. Moreover, it is appreciated that additional steps may also be included in process 500 in accordance with alternative embodiments. It is further appreciated that while embodiments are described herein with exemplary protocol Transmission Control Protocol (TCP), embodiments can use other protocols with flow control.

At step 502, a request for a portion of streaming media content is detected. The requests can be made from a media receiver to a media server as described above which streams the media to the media receiver. The media content may be streamed to the media receiver over a network using Hypertext Transfer Protocol (HTTP) and Transport Control Protocol (TCP). The requests can include HTTP GET requests for portions of the media content. The requests may be requests for the next portions in a piece of media content that is being streamed over a network. For example, a request may be for next the 250 kilobytes of video content.

At step 504, a response to the request is detected. The response to the request can contain the next portion of the media stream for playback.

At step 506, information about the throughput characteristics of the request response is gathered for analysis. In one embodiment, the information includes the delay or latency in receiving the initial data in response to a request. It can also include information about the transfer rate over the course of response. An initial delay or latency in receiving a response can indicate that that the network has some level of congestion. A change in the transfer rate over the course of a response can indicate bandwidth is available and flow control mechanisms are increasing the amount of data sent each time a transmission is made. For example, the initial transfer rate of a request response may be limited by TCP's slow start mechanism, whereby a transmission of data may begin at a lower transfer rate and increase to a standard rate over time, and as subsequent portions of the response are received, the server may consequently transmit at an increased transfer rate.

At step 508, the information gathered about the throughput characteristics is analyzed to determine adjustments to request parameters to improve playback by maximizing the use of available network bandwidth. It is appreciated that portions of the information gathered about request responses may be analyzed individually or in combination in order to determine appropriate changes to request parameters. The request parameters may be determined in order to stabilize and/or maximize the TCP window.

In one embodiment, if there is a delay or latency in receiving the initial data of a request, request parameters are determined to make requests smaller and more frequent. Similarly, if the initial data transfer rate is lower than the data received later in a response to a request, request parameters are determined to make smaller, more frequent requests. Adjusting the request parameters in this way may induce the flow control mechanisms to maintain the amount of data sent in each transmission. For example, the increase in frequency of requests can ensure that window raises are not lost, thus stabilizing the use of available bandwidth.

Conversely, where there is no latency or change in transfer rate over the course of a response, request parameters can be determined to make larger, more infrequent requests. These can be determined to cause flow control mechanisms to increase or maintain the amount of data sent with each transmission. For example, the increased size and lower frequency requests may result in lower processing overhead on the server and/or receiver.

At step 510, the request parameters are adjusted to induce flow control mechanisms into maximizing utilization of available bandwidth. Where there is a delay or latency in receiving the initial data of a request or the initial data transfer rate is lower than the data transfer rate later in a response to a request, request parameters are adjusted to make smaller requests with increased frequency. The request parameters can be adjusted to maintain or increase the TCP window and thus maximize the use of the available bandwidth. Conversely, where there is no latency or change in transfer rate during a request response, request parameters can be modified to make larger, more infrequent requests.

Figure 6:
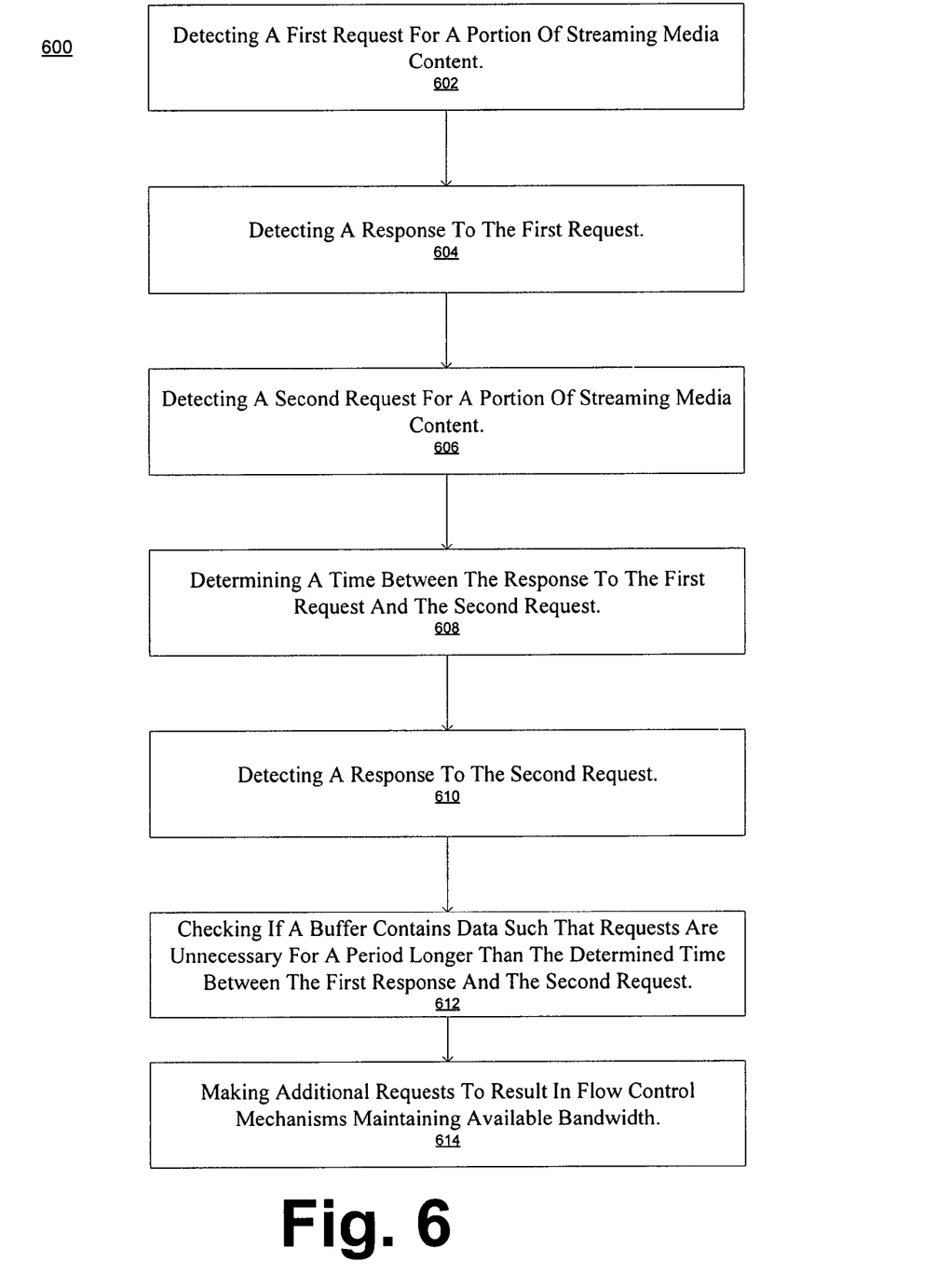
FIG. 6 is a flowchart of a process for maintaining available bandwidth, in accordance with an embodiment.

FIG. 6 is a flowchart of an exemplary process 600 for maintaining available network bandwidth, in accordance with an embodiment. Process 600 may be implemented on the operating environments described above. Process 600 is well-suited to be stored as instructions on a computer-readable medium. In an exemplary embodiment, process 600 operates on a media receiver. It is appreciated that not all steps of process 600 are necessary for the general goal of process 600 to be achieved. Moreover, it is appreciated that additional steps may also be included in process 600 in accordance with alternative embodiments.

At step 602, a first request for a first portion of streaming media content is detected. The requests can be made from a media receiver to a media server as described above which streams the media to the media receiver. The media content may be streamed to the media receiver over a network using Hypertext Transfer Protocol (HTTP) over Transport Control Protocol (TCP). The requests can include HTTP GET requests for the next portion of the media content. For example, a request may be a HTTP GET request for the next 250 kilobytes of video content.

At step 604, a response to the first request is detected. The response to the first request can be from a media server (e.g. media server 302) and contain the next portion of the media stream for playback.

At step 606, a second request for a second portion of streaming media content is detected. This request may be for the next sequential portion of the streaming media content.

At step 608, the time between the response to the first request and the second request is determined. The time between the completion of a request and the next request can be used to determine the appropriate amount of data that should be requested at one time based on the previous requests.

At step 610, a response to the second request is detected. The response to the second request can contain the next portion of the media stream for playback.

At step 612, a buffer is checked to see if it contains data such that requests will not be made for a period longer than the time determined between the response to the first request and the second request. The buffer is checked to detect situations where there are periods of inactivity longer than between previous requests, as a result of which flow control mechanisms may reduce the amount of data sent in response to a request and thus limit the effective bandwidth. For example, where a request is made for variable bit rate media, the buffer may hold data for playback for periods much longer than the normal buffer playback time and thus requests are unnecessary for an extended period of time during which time the flow control mechanism may revert to slow start behavior.

At step 614, additional requests are issued to result in flow control mechanisms maintaining available bandwidth. More specifically, requests are made to cause flow control mechanisms to maintain the amount of data that is sent during each transmission. The requests may be for small portions of the content. For example, the requests may be small HTTP GET requests for the next sequential portions of the content. The requests may also be requests whose purpose is to implicitly transmit window information to the server but return no content. For example, the requests may be HTTP HEAD requests which are similar to HTTP GET requests except they do not return the content body of a request. Thus, the requests may be made to maintain the TCP window such that the bandwidth available for the next request will be the same as the last request. The above described requests can be made on a different communication socket so as to not impact the communication socket currently being used for media content requests.

Figure 7:
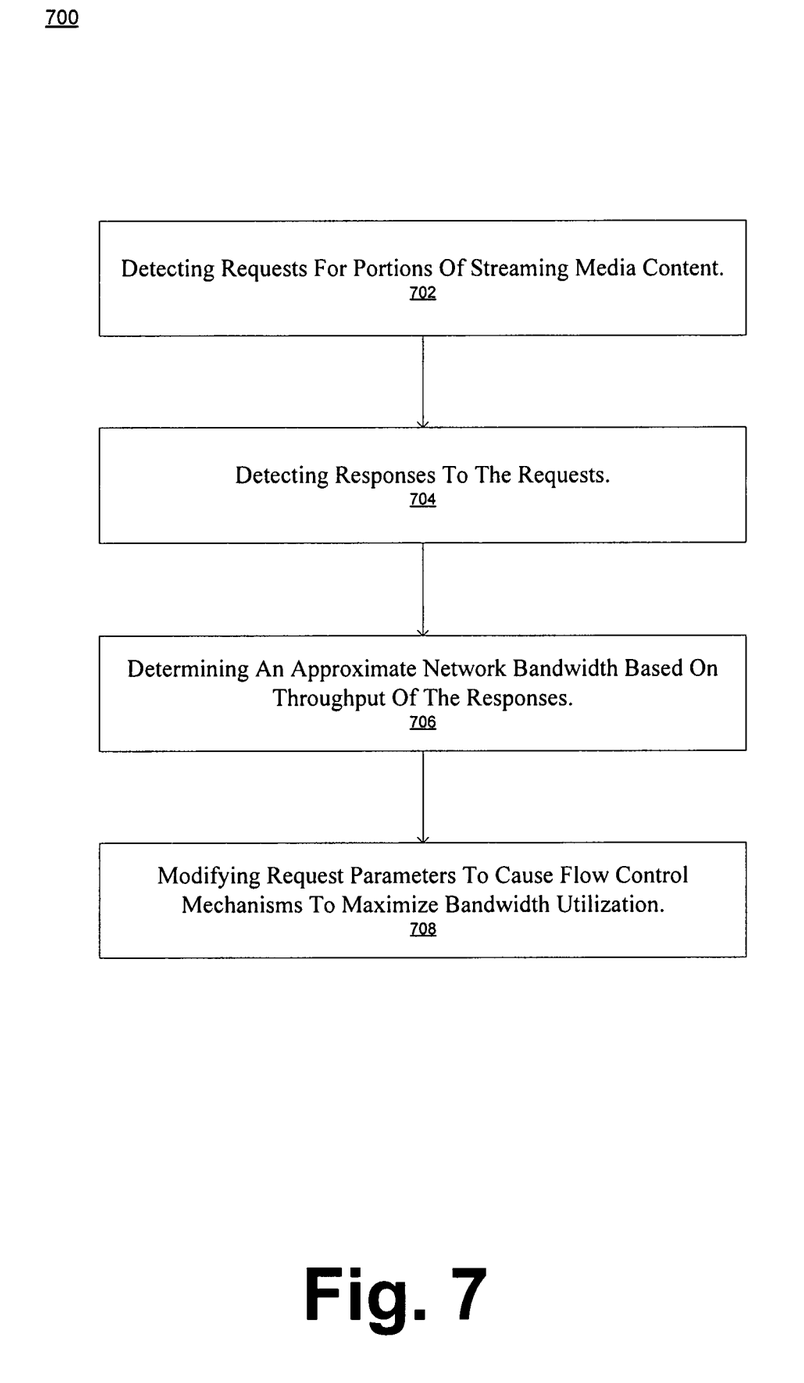
FIG. 7 is a flowchart of a process for maximizing bandwidth utilization, in accordance with an embodiment.

FIG. 7 is a flowchart of an exemplary process 700 for maximizing bandwidth utilization, in accordance with an embodiment. Process 700 may be implemented on the operating environments described above. Process 700 is well-suited to be stored as instructions on a computer-readable medium. In an exemplary embodiment, process 700 operates on a media receiver. It is appreciated that not all steps of process 700 are necessary for the general goal of process 700 to be achieved.

Moreover, it is appreciated that additional steps may also be included in process 700 in accordance with alternative embodiments. It is further appreciated that while embodiments are described herein with exemplary protocol Transmission Control Protocol (TCP), embodiments may use other protocols with flow control.

At step 702, a plurality of requests for a plurality of portions of a streaming media are detected. In one embodiment, the requests are made on a media receiver to a media server as described above which streams the media to the media receiver.

The media content may be streamed to the media receiver over a network using Hypertext Transfer Protocol (HTTP) over Transport Control Protocol (TCP). The requests can include HTTP GET requests for the portions of the media content.

At step 704, a plurality of responses to the requests are detected. The responses can be from a media server (e.g. media server 302) and contain the next portions of the media stream for playback.

At step 706, the approximate bandwidth is determined based on the throughput of the responses to the requests. The time it takes to receive each of the requests and the amount of data in each response is used to determine the throughput of the response. Then the throughput of each response is used to determine the approximate bandwidth available on the network.

At step 708, request parameters are modified to cause flow control mechanisms to maximize bandwidth utilization. The approximate network bandwidth is used to determine request parameters to be modified. Where network bandwidth is relatively limited, request parameters are moderated to prevent TCP from backing off, thus maximizing utilization of available bandwidth. Alternatively where network bandwidth is not relatively limited, request parameters are modified to moderate request frequency and size accordingly to use as much network capacity as is available without reaching network capacity and causing flow control mechanisms to reduce the amount of data sent with each transmission.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
receiving, at a media receiver, a portion of streaming media content transmitted from a media server over a network in response to a first content request sent by the media receiver, the media server having a flow control mechanism that transmits an amount of data the media receiver based on a Transport Control Protocol (TCP) window;
issuing, by the media receiver, a second content request for a next portion of the streaming media content to the media server;
detecting, at the media receiver, a response to the second content request that contains data corresponding to the next portion of the streaming media content;
downloading, at the media receiver, the data corresponding to the next portion of the streaming media content to a buffer for holding the data for playback;
monitoring, at the media receiver, a plurality of throughput characteristics comprising latency in receiving the response, changes in transfer rate of the response, and a time between completion of the first content request and initiation of the second content request;
determining, by the media receiver, that the TCP window is increasing based on the latency and the changes in transfer rate;
detecting, at the media receiver, that the data downloaded to the buffer will result in no subsequent content requests being issued for a period longer than the time between completion of the first content request and initiation of the second content request; and
adjusting, by the media receiver, parameters for issuing subsequent content requests to the media server based on the throughput characteristics, wherein the subsequent content requests are smaller and issued more frequently than previous requests to avoid reduction of the TCP window by the flow control mechanism of the media server.

2. The method of claim 1, wherein the streaming media is transmitted from the media server to the media receiver using Hypertext Transfer Protocol (HTTP) and Transport Control Protocol (TCP).

3. The method of claim 1, wherein each subsequent content request is a Hypertext Transfer Protocol (HTTP) GET request.

4. The method of claim 1, wherein the subsequent content requests transmit window information to the media server.

5. The method of claim 1, wherein the subsequent content requests comprise one or more Hypertext Transfer Protocol (HTTP) HEAD requests.

6. The method of claim 5, wherein the one or more HTTP HEAD requests are sent on a communication socket different from a communication socket used for the previous content requests.

7. A computer-readable storage device storing computer-executable instructions that, when executed by a processor of a media receiver, cause the media receiver to perform a method comprising:
receiving a portion of streaming media content transmitted from a media server over a network in response to a first content request sent by the media receiver, the media server having a flow control mechanism that transmits an amount of data to the media receiver based on a Transport Control Protocol (TCP) window;
issuing a second content request for a next portion of the streaming media content sent from the media receiver to the media server;

detecting a response to the second content request that contains data corresponding to the next portion of the streaming media content;

downloading the data corresponding to the next portion of the streaming media content to a buffer for holding the data for playback;

monitoring a plurality of throughput characteristics comprising latency in receiving the response, changes in transfer rate of the response, and a time between completion of the first content request and initiation of the second content request;

determining that the TCP window is increasing based on the latency and the changes in transfer rate;

detecting that the data downloaded to the buffer will result in no subsequent content requests being issued for a period longer than the time between completion the first content request and initiation of the second content request; and adjusting parameters for issuing subsequent content requests to the media server based on the throughput characteristics, wherein the subsequent content requests are smaller and issued more frequently than previous requests to avoid reduction of the TCP window by the flow control mechanism of the media server.

8. The computer-readable storage device of claim 7, wherein the subsequent content requests comprise one or more Hypertext Transfer Protocol (HTTP) HEAD requests.

9. The computer-readable storage device of claim 7, wherein the subsequent content requests comprise Hypertext Transfer Protocol [HTTP] GET requests.

10. The computer-readable storage device of claim 8, wherein the one or more HTTP HEAD requests are sent on a communication socket different from a communication socket used for the previous content requests.

11. The computer-readable storage device of claim 7, wherein the streaming media is transmitted from the media server to the media receiver using Hypertext Transfer Protocol (HTTP) and Transmission Control Protocol (TCP).

12. The computer-readable storage device of claim 7, wherein the subsequent content requests transmit window information to the media server.

13. A media receiver comprising:

a processor configured to execute computer-executable instructions; and memory storing computer-executable instructions for:

receiving a portion of streaming media content transmitted from a media server over a network in response to a first content request sent by the media receiver, the media server having a flow control mechanism that transmits an amount of data to the media receiver based on a Transport Control Protocol (TCP) window;

issuing a second content request for a next portion of the streaming media content to the media server;

detecting a response to the second content request that contains data corresponding to the next portion of the streaming media content;

downloading the data corresponding to the next portion of the streaming media content to a buffer for holding the data for playback;

monitoring a plurality of throughput characteristics comprising latency in receiving the response, changes in transfer rate of the response, and a time between completion of the first content request and initiation of the second content request;

determining, by the media receiver, that the TCP window is increasing based on the latency and the changes in transfer rate;

detecting, at the media receiver, that the data downloaded to the buffer will result in no subsequent content requests being issued for a period longer than the time between completion of the first content request and initiation of the second content request; and adjusting parameters for issuing subsequent content requests to the media server based on the throughput characteristics, wherein the subsequent content requests are smaller and issued more frequently than previous requests to avoid reduction of the TCP window by the flow control mechanism of the media server.

14. The media receiver of claim 13, wherein the streaming media content is transmitted from the media server using Hypertext Transfer Protocol (HTTP) and Transport Control Protocol (TCP).

15. The media receiver of claim 13, wherein each subsequent content request comprises Hypertext Transfer Protocol (HTTP) GET request.

16. The media receiver of claim 13, wherein the subsequent content requests comprise one or more Hypertext Transfer Protocol (HTTP) HEAD requests.

17. The media receiver of claim 13, wherein the subsequent content requests transmit window information to the media server.

18. The media receiver of claim 13, wherein the media receiver is a playback device within a home network.

19. The media receiver of claim 18, wherein the media receiver and the media server are connected within the home network.

20. The media receiver of claim 16, wherein the one or more HTTP HEAD requests are sent on a communication socket different from a communication socket used for the previous content requests.

* * * * *